United States Patent

Groth

[15] 3,702,008

[45] Oct. 31, 1972

[54] PROGRAM FOR POLLING PARTY LINE DATA STATIONS FOR MESSAGE PICKUPS

[72] Inventor: George Stephen Groth, Freehold, N.J.

[73] Assignee: Bell Telephone Laboratories, Incorporated, Murray Hill, N.J.

[22] Filed: Dec. 7, 1970

[21] Appl. No.: 95,737

[52] U.S. Cl. .................................444/1, 179/15 BA

[51] Int. Cl. .................................................H04j 3/12

[58] Field of Search ...............178/3; 340/172.5, 163; 179/15 BA, 15 BU; 444/1

[56] References Cited

UNITED STATES PATENTS

| | | | |
|---|---|---|---|
| 3,559,184 | 1/1971 | Rawlings et al | 340/172.5 |
| 3,644,678 | 2/1972 | Schmidt | 179/15 BA |
| 3,281,793 | 10/1966 | Oeters et al. | 340/172.5 |
| 3,396,372 | 8/1968 | Calvert | 340/172.5 |
| 3,573,745 | 4/1971 | May, Jr. | 340/172.5 |
| 3,245,045 | 4/1966 | Randleu | 340/172.5 |
| 3,244,804 | 4/1966 | Wittenberg | 178/3 |
| 3,407,387 | 10/1968 | Looschen et al. | 340/172.5 |

*Primary Examiner*—Harvey E. Springborn
*Attorney*—R. J. Guenther and Kenneth B. Hamlin

[57] ABSTRACT

Data stations on multistation lines are polled for messages in accordance with a program which directly varies the number of times each station is polled during a polling round with the quantity of messages available at the station, as determined by responses to prior pollings. Initially, all stations are polled and the identities of those having available messages are placed in a data pattern defining an alternate poll code sequence. The alternate sequence is then utilized for subsequent polling rounds during which the data pattern is modified by wiping out the identities of stations no longer having messages. After a predetermined number of alternate rounds or after all the messages are collected, whichever occurs first, the initial polling round is again sent and the process repeated. Data processing is provided by a programmed general purpose computer.

13 Claims, 23 Drawing Figures

INVENTOR
G. S. GROTH
BY R C Lipton
ATTORNEY

FIG. 5

MASK

| | | | | | | | | | INDEX |
|---|---|---|---|---|---|---|---|---|---|
| 1 | 1 | 1 | 1 | 1 | 1 | 1 | 1 | 1 | 0 |
| 1 | 1 | 1 | 1 | 1 | 1 | 1 | 1 | 0 | 1 |
| 1 | 1 | 1 | 1 | 1 | 1 | 1 | 0 | 0 | 2 |
| 1 | 1 | 1 | 1 | 1 | 1 | 0 | 0 | 0 | |
| 1 | 1 | 1 | 1 | 1 | 0 | 0 | 0 | 0 | |
| 1 | 1 | 1 | 1 | 0 | 0 | 0 | 0 | 0 | |
| 1 | 1 | 1 | 0 | 0 | 0 | 0 | 0 | 0 | |
| 1 | 1 | 0 | 0 | 0 | 0 | 0 | 0 | 0 | ↓ |
| 1 | 0 | 0 | 0 | 0 | 0 | 0 | 0 | 0 | n |

FIG. 6

WIPE

| | | | | | | | | | INDEX |
|---|---|---|---|---|---|---|---|---|---|
| 1 | 1 | 1 | 1 | 1 | 1 | 1 | 1 | 0 | 0 |
| 1 | 1 | 1 | 1 | 1 | 1 | 1 | 0 | 1 | 1 |
| 1 | 1 | 1 | 1 | 1 | 1 | 0 | 1 | 1 | 2 |
| 1 | 1 | 1 | 1 | 1 | 0 | 1 | 1 | 1 | |
| 1 | 1 | 1 | 1 | 0 | 1 | 1 | 1 | 1 | |
| 1 | 1 | 1 | 0 | 1 | 1 | 1 | 1 | 1 | |
| 1 | 1 | 0 | 1 | 1 | 1 | 1 | 1 | 1 | |
| 1 | 0 | 1 | 1 | 1 | 1 | 1 | 1 | 1 | ↓ |
| 0 | 1 | 1 | 1 | 1 | 1 | 1 | 1 | 1 | n |

FIG. 7

SETONE

| | | | | | | | | | INDEX |
|---|---|---|---|---|---|---|---|---|---|
| 0 | 0 | 0 | 0 | 0 | 0 | 0 | 0 | 1 | 0 |
| 0 | 0 | 0 | 0 | 0 | 0 | 0 | 1 | 0 | 1 |
| 0 | 0 | 0 | 0 | 0 | 0 | 1 | 0 | 0 | 2 |
| 0 | 0 | 0 | 0 | 0 | 1 | 0 | 0 | 0 | |
| 0 | 0 | 0 | 0 | 1 | 0 | 0 | 0 | 0 | |
| 0 | 0 | 0 | 1 | 0 | 0 | 0 | 0 | 0 | |
| 0 | 0 | 1 | 0 | 0 | 0 | 0 | 0 | 0 | |
| 0 | 1 | 0 | 0 | 0 | 0 | 0 | 0 | 0 | ↓ |
| 1 | 0 | 0 | 0 | 0 | 0 | 0 | 0 | 0 | n |

FIG. 9A

```
POLLIN   LDA     POL
         STR     ENTRY
ENTRY    EDI     0,0        GET RESPONSE
         JMP     *-1        NO RESP.,TRY AGAIN
         CAA     MSG        K-RESPONSE
         JMP     NMSG
         JMP     INVAL
THREE    LDA     TMO        MESSAGE
         ADD     LTFLD      K-M.T/O-LTFLD
         ONA                INVERT
         ANA     STATUS     K-T/O-LTFLD,ZEROED
         ADD     MESG       LTFLD ENCODE=MSG
         STA     STATUS     M-STATUS
         JMP     MESS       T-RCV MSG.
INVAL    LDA     INV        INVALID RESP.
         ANA     STATUS     K-INV. RESP. BIT
         SAZ     1
         JMP     ENTRY      IF SET RETURN
         LDA     STATUS     SET INV RESP. BIT
         ADD     INV
         STA     STATUS
         JMP     ENTRY      T-WAIT
*
*
NMSG     NOP                ZERO TIMER
         LDA     TMO        NOMSG.
         ONA                ZERO T/O, INVERT
         ANA     STATUS
         STA     STATUS     M-STATUS,ZEROED TIMER
         LDA     ASPMSP
         SAZ     1
         JMP     TWELV
ELEVEN   LDA     INDEX      MSP
         ANA     STATUS     K-OF LAST STA.
         ADD     ONE        K-K+1
         CAA     STACNT     IS MSP OVER
         JMP     FIVE       T-MSP OVER
         NOP
         STA     STORE      M-TEMP. INX,NEW CNT
         SPACE   1
```

FIG. 9B

```
SIX      LDX    STORE      X-INX
         LDA    MASK,I     K-PROPER MASK
         ANA    MSPWRD     K-NEXT POLL INDEX,IF ANY
         SAG    1
         JMP    FIVE       T-IF NO MORE TO POLL
         LDX    =0
         STX    STORE      ZERO MEM SLOT
FORTY9   SLZ    1          SKIP IF LSB=0
         JMP    PO         T-PO IF LSB=I
         INC    STORE      STORE=STORE+I
         NOP
         LRN    1          SHIFT R 1
         JMP    FORTY9     T-TEST BIT
PO       LDA    INDEX
         ONA
         ANA    STATUS     ZERO INDEX
         ORA    STORE      OR IN NEW INDEX
         STX    STORE      X-INDEX
         STA    STATUS
         LDA    POLTAB     GET SPC
         STR    SEND
         SPACE  1
SEND     EDO    0,0        SEND OUT POLL
         JMP    *-I        NOT SENT TRY AGAIN
SETMAP   NOP
         JMP    ENTRY      WAIT FOR RESP.
MESS     EDI    0,0        RCVNG MSG LOOK FOR EOM
         JMP    MESS
         CAA    EOM
         JMP    PROCES     MSG
         JMP    PROCES     MSG
         LDA    ASPMSP     EOM CHK ASPMSP
         ANA    STATUS     K-ASPMSP BIT
         SAZ    1
         JMP    ASP        ASP
         LDA    INDEX
         ANA    STATUS     K-INDEX
         XXA
         LDA    SETONE,I
         ADD    ASPWRD
         STA    ASPWRD
         JMP    ELEVEN
ASP      LDA    INDEX
         ANA    STATUS     K-INDEX
         JMP    FOUR
```

FIG. 9C

```
*
*
PROCES   JMP   RETURN
*                      NO MSG., ASP ROUND OVER
TWELV    LDA   INDEX   K-M. INDEX
         ANA   STATUS  K-INDEX
         XXA
         LDA   WIPE,1  K-PROPER WIPE MASK
         ANA   ASPWRD  K-ASP PATTERN BIT ZEROED
         STA   ASPWRD  M-ASP PATTERN
         XXA           K-INDEX
FOUR     ADD   ONE
         CAA   STACNT  END OF RND?
         JMP   NINE    RND DONE
         NOP
EIGHT    STA   STORE   M-INDEX
         XXA           X-INDEX
         LDA   MASK,1  K-PROPER MASK
         ANA   ASPWRD  K-ASP PATTERN
         SAG   1       SKIP IF MORE TO POLL
         JMP   NINE    NO MORE IN RND
         XXA           K-INDEX,X-ASP PATT.
         ORA   ORINC   OR IN $CO WITH INDEX
         STA   SHIFT
         XXA           K-ASP PATTERN
SHIFT    LRN   0
         JMP   FORTY9
*
NINE     LDA   ASPCNT  M. ASP COUNT
         ANA   STATUS  K-STATUS-COUNT
         LRN   8
         ADD   ONE
         LLN   8       POSITION
         STA   STATUS
         CAA   ASPMAX
         JMP   TEN     K>ASPMAXP
         NOP
         LDA   INDEX
         ONA           K-M.INDEX,INVERTED
         ANA   STATUS
         STA   STATUS  M-INDEX ZEROED
         LDA   ASPWRD  K=ASP WORD
         SAZ   2       SKIP 2 IF NO ASP TO DO
         CLA   K=0
         JMP   EIGHT
         JMP   TEN     NOASP, START MSP
```

FIG. 9D

```
*
TEN     LDA   INDEX        K-M. INDEX
        ADD   ASPCNT       M. ASP COUNT
        ADD   ASPMSP       M. ASPMSP IND.
        ONA                INVERT
        ANA   STATUS       ZERO 3 ITEMS
        STA   STATUS
        LDX   =0           ZERO MEM.
        STX   ASPWRD       ZERO ASP WORD
        STX   STORE        SLOT
        JMP   SIX          T/START MSP
*
FIVE    LDA   INDEX        START ASP ROUND
        ONA   ZERO INDEX
        ANA   STATUS
        ORA   ASPMSP       SET ASP BIT
        STA   STATUS       M-STATUS
        LDA   ASPWRD       CHECK ASP WORD
        SAG   1            SKIP IF NONZERO
        JMP   SEVEN        T-NO ASP
        CLA   K=0
        JMP   EIGHT        T-ASP POLL ROUTINE
*
SEVEN   LDA   LTFLD
        ONA
        ANA   STATUS
        ADD   IDLE         SET LT=IDLE
        NOP                DUMMY, SET TIMER
        NOP                DUMMY, SEND SPOL SEQUENCE
        JMP   RETURN
*
*                          TIME OUT
        LDA   TMO          M.T/O
        ANA   STATUS
        SAZ   1            SKIP IF FIRST T/O
        JMP   SEC
        LDA   INV          M.INV. BIT
        ONA                INVERT
        ANA   STATUS       K-STATUS,INV RESP. BIT ZEROED
        STA   STATUS       STORE STATUS
        ANA   INDEX        K-INDEX
        STA   STORE        M-INDEX
        JMP   PO
*
```

FIG. 9E

```
SEC     ONA                 SET UP TO ZERO T/O BITS
        ANA     STATUS      K-STATUS T/O ZEROED
        STA     STATUS      STORE STATUS
        ANA     INV         CHK INV BIT
        SAG     1           SKIP IF SET
        JMP     NMSG        T- NO MSG.
        JMP     ABORT
*
ABORT   NOP                 DUMMY, SEND SER. MSG.
        JMP     NMSG        T/NO MSG. ROUTINE
        SPACE   1
*                           SPOL
*
SPOL    NOP                 DUMMY, TURN OFF TIMER
        LDA     LTFLD
        ONA                 INVERT
        ANA     STATUS      ZERO STATUS, ADD POLL
        ADD     POLL
        STA     STATUS
        JUMP    TEN         START ON MSP
        SPACE   1
RETURN  NOP                 DUMMY
        JMP     *-1
*
```

FIG. 10

```
HOPPER      DS      1
GARB        DC      2
NOMSG       DC      1
MSG         DC      3
STATUS      DS      1
INV         DC      $800
ASPMSP      DC      $1000
TMO         DC      $2000
ASPCNT      DC      $700
INDEX       DC      $1F
POLTAB      DS      16
LTFLD       DC      $C000
IDLE        DC      $4000
POLL        DC      $8000
MESG        DC      $0
POL         DC      $12
IDL         DC      $22
STACNT      DC      15
ONE         DC      1
STORE       DS      1
MSPWRD      DS      1
MASK        DS      16
EOM         DC      $F
WIPE        DS      16
ASPWRD      DS      1
ORINC       DC      $C0
ASPMAX      DC      $300
SETONE      DS      16
            END
```

PROGRAM FOR POLLING PARTY LINE DATA STATIONS FOR MESSAGE PICKUPS

FIELD OF THE INVENTION

This invention relates to data message pickup from station transmitters on a multistation line and, more particularly, to a machine process for polling party line stations for data messages.

DESCRIPTION OF THE PRIOR ART

In data message switching and processing systems a significant portion of the data messages comprises only ten's of words and therefore requires a relatively short time interval for transmission. Since the line time of the transmitter is short for each message it is advantageous to connect groups of transmitters to a common party or multistation line. To preclude contention between the transmitters for the common line, a master controller is utilized on the multistation line to collect the data messages. One example of a message collection system involves a main station, which includes a data processor which may be in the form of a general purpose computer, that monitors the line to determine the various line conditions and modes, collects the messages from the various stations for distribution to other stations or to other lines, and polls the several data stations on the line to determine whether the stations have available messages and to start the individual stations having messages available thereat. The data processor performs the functions of a master controller and eliminates contention between the several transmitters.

If a party line system involves a great number of individual stations, the transmission time occupied by the polling codes used to select the various station transmitters can be comparable to the data message transmission time. It is therefore an important object of this invention to minimize the time interval required to query and obtain responses from the various stations on the line.

In a conventional party line system certain stations typically have more messages to transmit than others. Other variable conditions may exist wherein one station may conventionally have a great many messages to transmit during one period of the day while having very few during other periods during the day. Other situations may arise, of course, wherein certain stations have messages during fortuitous periods and the quantity or the number of these messages may similarly vary from time to time.

In order to reduce the polling time and to accommodate these varying conditions, it has been arranged in the prior art that certain busy stations are provided precedence over other stations. One particular precedence arrangement provides a polling cycle for collecting messages only from these preferred stations and an alternate polling cycle for collecting messages from all of the other stations or, alternatively, from all of the stations whether they are stations of low or high preference. In a typical procedure, the master controller goes through a plurality of precedence polling cycles in which stations of low preference are skipped. The controller thereupon proceeds to go through one alternate polling round wherein all the stations are called. This type of a procedure is adequate so long as heavy message traffic does not become available at the low precedence stations or heavy message traffic continues to become available at the high precedence stations. Obviously, after a high precedence station no longer has heavy message traffic, preferential polling of this station would constitute a waste of valuable line time. Similarly, the failure to preferentially poll the low precedence stations having heavy message traffic results in a delay of the transmission of these messages.

Another procedure for reducing the polling time interval involves polling high message traffic stations a plurality of times for each polling round. This arrangement, although permitting every station to be polled during each round, has disadvantages similar to the precedence polling process in that when the quantity of messages becomes reduced at a high traffic station, continued multiple polling of the station results in waste of line time. Accordingly, it is an object of this invention to directly vary the number of times the party line stations are polled with the quantity of message traffic available at the various stations.

SUMMARY OF THE INVENTION

The present invention is directed to a machine process which directly varies the number of times a station polling code appears in a polling cycle with the quantity of message traffic available at the station as determined from previous responses of the station. More specifically, the main controller data processor is programmed to form a data pattern defining the sequence of polling codes for the polling cycle by adding or inserting data in the pattern designating the polling code of each station whose prior response indicated that a message is available at the station. The data processor is further programmed to thereafter "-wipe out" data from the pattern designating any station whose subsequent response indicates that no message is available at the station. In this manner, successive cycles or rounds of polling code sequences are modified by the various station responses and each station is periodically polled so long as it has messages available.

In the illustrative embodiment of this invention, disclosed hereinafter, the main controller comprises a data processor which takes the form of a general purpose computer. The processor has stored therein the polling codes of all the stations and is programmed to provide a machine process for polling the several stations on a multistation line. Initially in the process, the first polling round or cycle to be transmitted includes the poll codes of all the stations. This is hereinafter called the main sequence. A data pattern to define an alternate sequence of polling codes is formed in accordance with the responses by the several stations to the codes in the main sequence. Thereafter, the alternate sequence, as defined by the data pattern, is transmitted to poll the stations identified therein. The responses to the alternate sequence now modifies the data pattern to form a new alternate sequence and the process of transmitting the new sequence and modifying the data pattern is repeated a predetermined number of times or until no further stations have messages available, whichever occurs first. In either event, the processor is programmed to retransmit the main sequence and again form a data pattern.

The foregoing and other objects and features of this invention will be more fully understood from the following description of an illustrative embodiment thereof taken in conjunction with the accompanying drawings.

DETAILED DESCRIPTION

Figure 1:
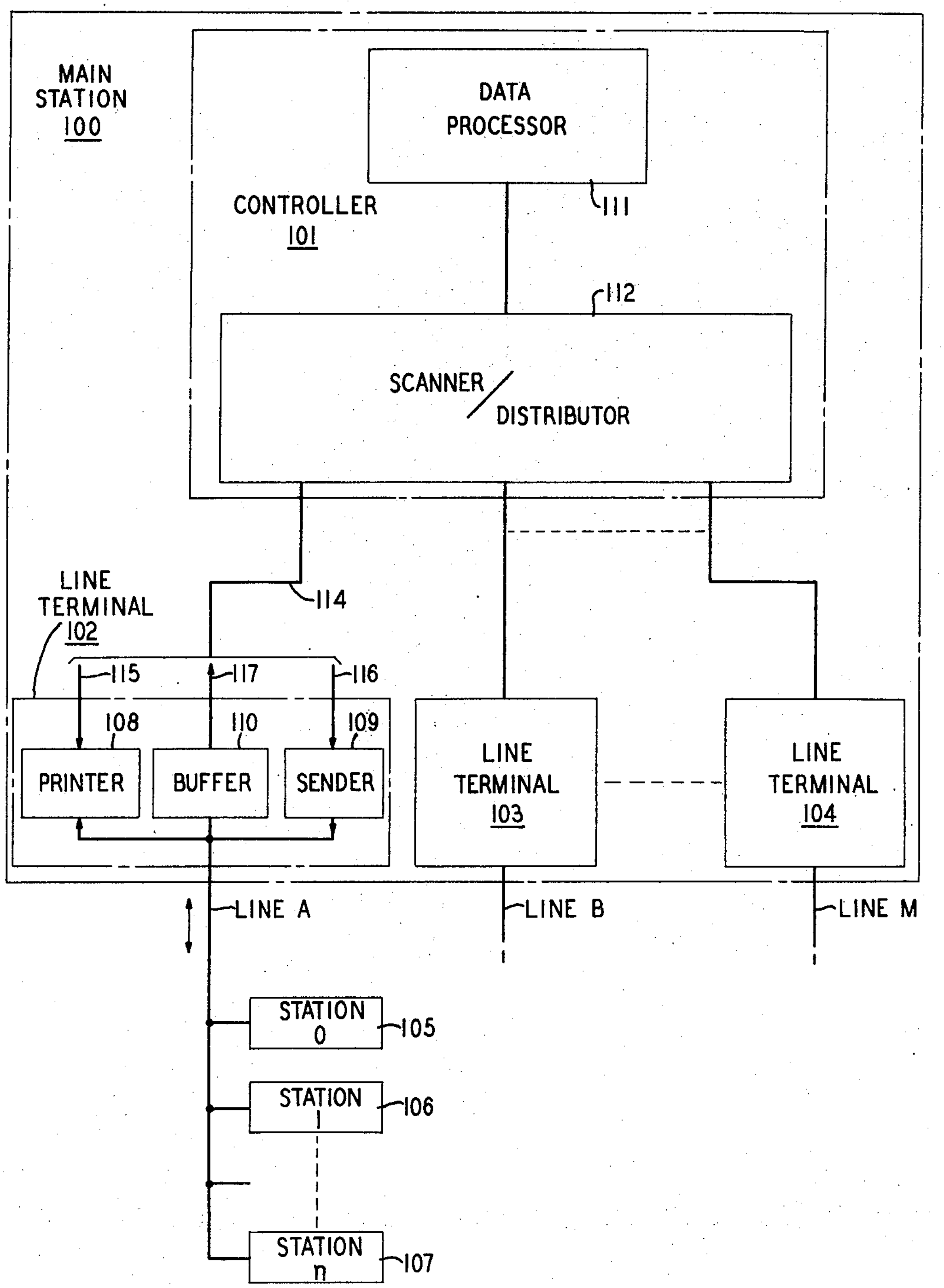
FIG. 1, which shows, in block form, a multistation line polling system including equipment suitable for providing a machine process in accordance with this invention, FIGS. 2 to 7 disclose memory organizations of a data processor illustrating a preferred arrangement for implementing a machine process in accordance with this invention, FIGS. 8A to 8J disclose flow charts defining a machine process in accordance with this invention, FIGS. 9A to 9E disclose a listing of a computer program which, when utilized by a general purpose computer of the type disclosed hereinafter, provides a machine process in accordance with this invention, and FIG. 10 discloses a program listing of the information initially stored in the computer.

The system shown in FIG. 1 includes main station 100 and at least one multistation line, such as line A. Line A has *n* stations connected thereto, identified as stations 105 through 107. In main station 100, line A extends to line terminal 102. Line terminal 102, in turn, is connected by way of leads 115 through 117 to controller 101, by way of common cable 114. It is to be noted that leads 116 and 117 may comprise single leads or, where it is desirable to use parallel transmission, may instead comprise a plurality of parallel leads.

In general, controller 101 includes equipment for receiving and decoding various code signals from the outlying stations on multistation line A and is programmed to process the data in these incoming signals together with information and data stored in controller 101. In accordance with this processing, controller 101 is arranged to send data back over lead 116 to line terminal 102, whereupon the terminal transmits code signals to line A. Controller 101 also signals over line 115 to enable line terminal 102 to print incoming messages from stations on multistation line A.

Controller 101 generally includes data processor 111, which advantageously comprises a general purpose computer. It is contemplated that this computer may be time shared by a plurality of multistation lines in addition to line A, such as lines B through M, which lines are interconnected with controller 101 by way of line terminals, such as line terminal 103 and line terminal 104. It is to be understood that each of these other multistation lines may be substantially identical to line A, line terminals 103 and 104 may be substantially identical to line terminal 102, and the manner of processing data for these lines may be substantially identical to the manner of processing data for line A. To this end line terminals 103 and 104, together with line terminal 102, are interconnected with data processor 111 by way of scanner/distributor 112. The function of scanner/distributor 112 is to time share data processor 111 with line terminals 102 through 104. Specifically, incoming information from the line terminals is fed to data processor 111 by way of scanner/distributor 112 within time slots individual to each of the multistation lines. Similarly, outgoing data and information is passed back to each of the line terminals by scanner/distributor 112 in slots individual thereto. Scanner/distributor 112 may advantageously comprise an electron stepping switch to successively interconnect data processor 111 and each of the line terminals in appropriate and individual ones of the time slots of each cycle of data processor 111 in any well known and conventional manner.

The major equipment in each line terminal, such as line terminal 102, includes printer 108, sender 109 and buffer 110.

The function of buffer 110 is to accumulate and store data characters received over line A and, upon the reception of a complete data character, transmit the data over lead 117 to controller 101. If it is desired to send the bits of each data character in parallel to controller 101, then lead 117 will comprise a plurality of parallel leads, one for each data bit.

Figure 2:
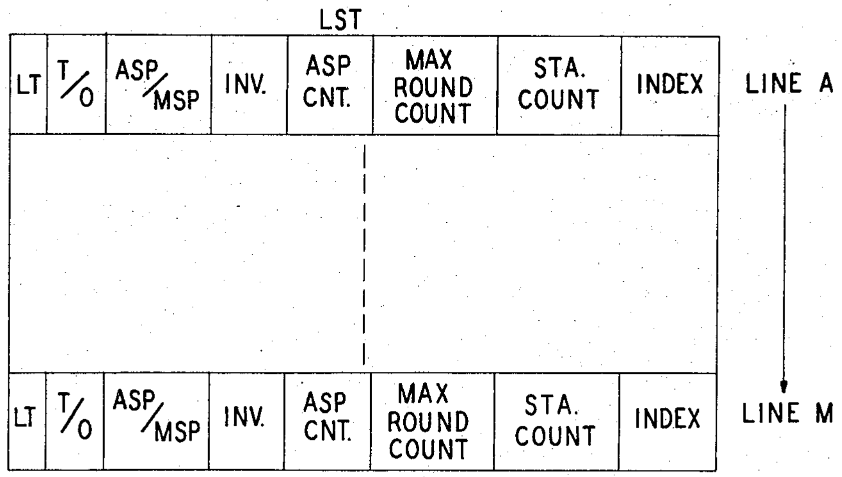

Code sender 109 accepts data bits from controller 101 by way of lead 116 and, in response thereto, transmits data characters out over line A. If the data bits from controller 101 are received in parallel, then leads 116 will, of course, comprise a lead for each bit in the data character. Line terminal equipment for accumulating data characters serially received over a line and cooperating equipment for scanning the data characters accumulated in a plurality of terminals and applying the data to a common bus in individual time slots are shown in FIG. 1 of U.S. Pat. No. 3,310,626, issued to F. T. Cassidy, Jr. on Mar. 21, 1967. Equipment for distributing multiplexed data characters to line terminals and line terminal equipment for transmitting the data serially over a line are shown in FIG. 2 of the above-referred to patent.

Printer 108 comprises a conventional data printer, such as a teletypewriter, for printing incoming messages from line A. Printer 108 is normally blind to the incoming signals and is arranged, when enabled by controller 101 via lead 115, to print the incoming message received thereafter until the reception of the end-of-message code, whereupon the printer again becomes blinded to the incoming code signals.

Each of the stations, such as stations 105 through 107 on line A, is arranged to receive and detect polling codes and to recognize the polling code individual to the station. In response to the reception of the individual polling code the outlying station is further arranged to send a data message if a message is available thereat or to return a NO MESSAGE response in the event that no message is available at the station. Assuming that a message is available, the station proceeds to send the message until the end-of-message signal, whereupon data transmission from the station ceases and the station is again arranged to receive and detect polling codes. Each station is further arranged to receive and detect a "SUSPEND POLLING" code and upon the reception of this code the station goes into a SUSPEND POLLING mode or condition. In this condition the station equipment is arranged to send a "BID" character to main station 100 when a message becomes available at the station.

Station control equipment for a multistation line which performs the various functions described above is disclosed in U.S. Pat. No. 3,001,010, which issued to J. P. Mahony et al. on Sept. 19, 1961.

It is the function of controller 101 to process data stored therein together with incoming data from the multistation line to form a sequence of polling codes to poll the various stations on the line. In accordance with this information, data processor 111 is programmed to initially form a specific sequence of polling codes, hereinafter called a MAIN SKIP POLL (MSP), and this sequence of codes is initially transmitted to the line to poll the various stations for messages. When any station response indicates that a message is available thereat, the data processor is programmed to form an additional sequence of polling codes, hereinafter referred to as an ALTERNATE SKIP POLL (ASP) which will contain the station polling codes of those stations having available messages. The subsequent sequences of polling codes thereafter transmitted to the line comprise the ASP pattern and thus, for the subsequent sequences, only those stations which previously had messages are again polled. During the subsequent sequences, however, polling codes are removed from the ASP pattern when the corresponding stations respond that no additional messages are available. Data processor 111 is further programmed to return to the MSP pattern after a predetermined number of ASP rounds are transmitted or if all the stations have been wiped from the ASP pattern.

In accordance with a specific program disclosed herein, data processor 111 is also arranged to load a SUSPEND POLLING character in sender 109 when none of the stations has a message available thereat during a complete MSP or ASP polling cycle. The data processor then goes into a SUSPEND POLLING mode until a station makes a bid or a predetermined interval expires, whereupon the processor reinitiates a new MSP cycle. Additional functions of data processor 111 include timing certain intervals, such as the interval stations take to respond to the polling codes and the time duration allocated to the SUSPEND POLLING mode; determining whether the response data is proper or improper; and loading service messages in sender 109 when any station returns improper responses to polling codes.

In order to affect the specific machine process disclosed hereinafter, certain information is stored in the memory of the processor in the form of words and tables. A mapping of these memories is shown in FIGS. 2 through 7.

FIG. 2 discloses a listing of line status words. Each word is individual to a particular multistation line. As seen in FIG. 2, each word is listed horizontally and the uppermost word identifies the status word for line A. The words underneath are the status words for lines B through M.

The line status word for line A can be considered as typical. This word comprises a multibit sequence divided into eight portions or items. The first, or leftmost item, as seen in FIG. 2, is the "line tag" (LT) which comprises the data bits that identify the present status of line A.

Continuing to the next item on the right, these data bits (shown as block T/O in FIG. 2) define the count of the number of timeouts which occur when a station fails to respond to its polling code. To the right of the time-out count portion in the line status word is a single bit (identified as MSP/ASP) which indicates whether the MAIN SKIP POLL (MSP) or the ALTERNATE SKIP POLL (ASP) is being transmitted. The following bit in the line status word (identified as INV) indicates when an invalid response is received. The data portion following the invalid response bit (identified as ASP CNT) provides a count of the number of completed ASP rounds. The data portion which defines the predetermined maximum number of successive ASP rounds which are permissible before another MSP round is transmitted is shown following the ASP count. The next portion of the line status word provides a station count number which defines the number of outlying stations on the multistation line. The final data portion of the line status word provides an index number which, as described hereinafter, indicates the number of the station being called. It is to be appreciated that the data in the line status word may be fixed or altered during each polling cycle, in accordance with the programming of the data processor.

Figure 3:
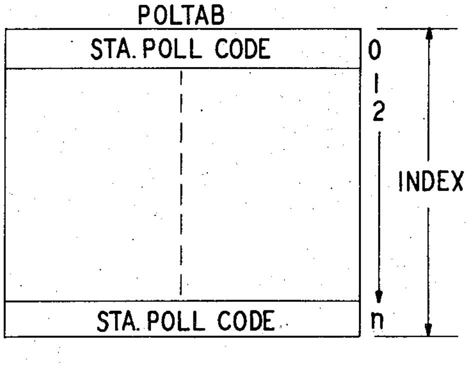

The station poll codes for the various stations are stored in a poll table (POLTAB), shown in FIG. 3. The station poll code for each station on the line is displayed horizontally in the POLTAB memory and adjacent to an index number corresponding to the station number. As seen in FIG. 3, the index number is displayed to the right of the memory with index "0" to the right of the station poll code of station "0" and corresponding index numbers to the right of the other station poll codes. The station poll codes of each line are preferably identical to each of the other lines, whereby the POLTAB memory may be used in common for all the lines.

Figure 4:
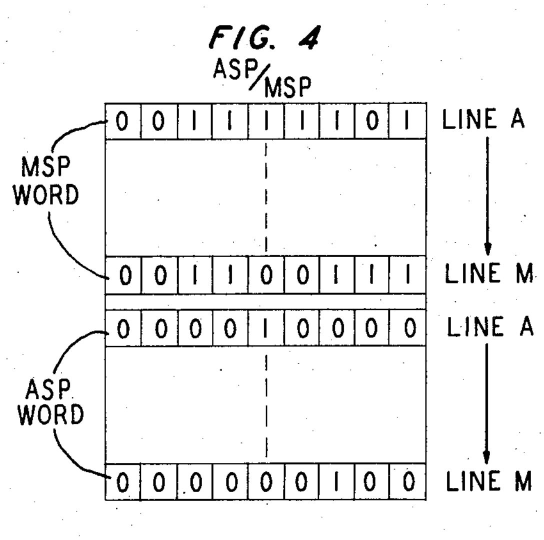

The table of words for the MAIN SKIP POLL (MSP) and ALTERNATE SKIP POLL (ASP) is shown in FIG. 4. The upper portion of the memory is devoted to the MSP words with one horizontal word individual to each of the lines. The upper MSP word, therefore, identifies the MSP word for line A and each succeeding word identifies the MSP word for lines B through M. Each MSP word defines a pattern of bits which discloses whether or not the stations are to be polled during the MSP cycle. Examining the MSP word for line A, and starting with the rightmost bit, it is seen that this bit, being set to "1", indicates that station "0" is to be polled during the MAIN SKIP POLL cycle. The next bit to the left, being a "0", indicates that station "1" is to be skipped.

Succeeding stations will thereafter be polled or skipped when their corresponding bit is set to "1" or "0", respectively. As seen in FIG. 4, the final bits to the left are "0's", which might indicate that the number of stations has been exhausted and no further stations are to be polled. The MSP word is therefore coded (perhaps in accordance with instructions from the various subscribers) to indicate whether or not the various stations are to be polled for message traffic during the MSP cycle.

Proceeding now down to the ASP words, it is seen that these words also correspond to each of these lines and define a similar pattern of bits. As in the case of the MSP word, each "1" bit indicates that the corresponding station is to be polled during the ASP polling cycle. Initially, all the bits in the ASP word are "0". The bits are thereafter modified as determined by the responses of the polled stations. The manner in which the ASP word is formed and modified in the ASP/MSP word list is described in detail hereinafter.

A listing of MASK words is shown in FIG. 5. Each word is identified by the index number to the right of the MASK word as seen in FIG. 5. It is to be noted that the index "0" word contains all "1" bits. The index "1" word has a "0" in the rightmost bit position, the index "2" word has two "0" bits in the two rightmost bit positions and so on down to the index $n^{th}$ word which has "0" bits in the $n$ rightmost bit positions. As disclosed in detail hereinafter, the MASK word is utilized together with the MSP word or the ASP word to ascertain the next station to be polled.

A list of WIPE words is shown in FIG. 6. Each WIPE word is identified by an index number on the right, as seen in FIG. 6. The word contains one "0" bit, the remaining bits being "1". The index "0" word has a "0" bit in its rightmost bit position, the index "1" word has a "0" bit in the next-to-rightmost bit position (bit position one) and the index "2" word has a "0" bit in the second from rightmost bit position, and so on down to the $n^{th}$ word. As disclosed hereinafter, the WIPE words are utilized to wipe "1" bits from the ASP word.

FIG. 7 shows the memory list of the SETONE words. All but one of the bits are "0". With reference to the index numbers on the right, as seen in FIG. 7, the index "0" word has a "1" bit in the rightmost position, the index "1" word has a "1" bit in the next-to-rightmost position and the index "2" word has a "1" bit in the second from rightmost position. The SETONE word is utilized to insert "1" bits in the ASP word, as described hereinafter.

The previous description of the multistation line system shown in FIG. 1 and the memory organization shown in FIGS. 2 through 7 are directed to an arrangement where data processing for a plurality of multistation lines is provided by a data processor, such as a general purpose computer, which can be time shared by a plurality of multistation lines. The memory organization shown in FIGS. 2 through 7 is so arranged to permit this time sharing. The data processing of the information from a single line will now be discussed with respect to flow charts shown in FIGS. 8A through 8J. It is to be realized, of course, that these flow charts are directed to one line and therefore to one time slot in the operational cycle of the data processor. The data processing occurring in each of the other time slots corresponding to other lines can be considered as being substantially identical.

The flow charts shown in FIGS. 8A through 8J symbolically define various functions and states encountered by the data processor. The circles shown in the flow chart represent entry and exit points. These exit and entry points may occur at certain fixed states or conditions of the multistation lines or, alternatively, at some transient state or condition. In any event, the function of the circle symbolically is primarily to indicate entrance and exit points of the flow. Various functions performed by the data processor and external stimuli are symbolically represented by rectangles, while diamond-shaped symbols define the decision making logic operation of the data processor.

Figure 8A:
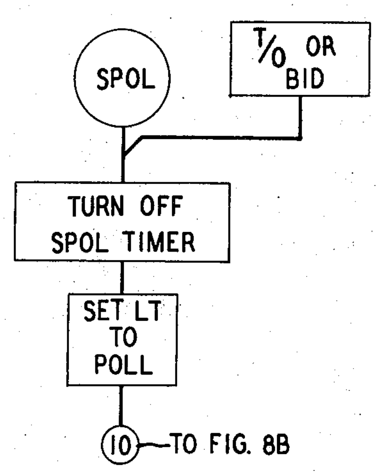

Refer now to FIG. 8A. The uppermost entry point shown in the Figure defines a rest state of the multistation line, which hereinafter is called the SUSPEND POLLING (SPOL) state. In this state the activity of the multistation line is suspended, the data processor is providing timing to limit the duration of the SUSPEND POLLING state to a predetermined interval (such as fifteen minutes), and the data processor is monitoring for bids from any of the various stations on the line. Assume now that a timeout of the timer occurs, indicating the termination of the 15 minute period or that a bid is received from one of the outlying stations. In response to either of these events, the data processor turns off the SUSPEND POLLING timer and modifies the LT tag of the status word to indicate that the line status is being placed in the POLL state. In the flow chart shown in FIG. 8A, this leads to exit point 10.

Figure 8B:
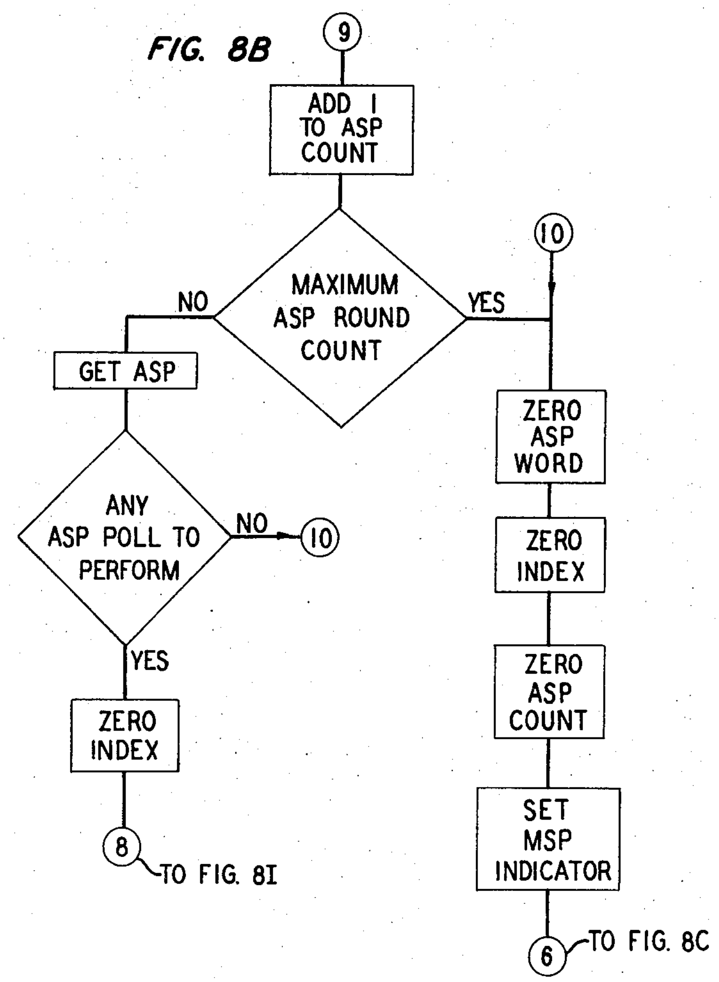

Entry point 10, shown in FIG. 8B, corresponds to exit point 10 in FIG. 8A, and defines a transient state. During this transient state the ASP word bits are all set to "0," the INDEX item number in the status word is set to "0," the ASP count in the status word is also set to "0" and the ASP/MSP indicator is set to indicate "MSP." The status word of the line therefore at this time defines a POLLING state for the multistation line and the identity of the next station to be polled is the first station in the MAIN SKIP POLL pattern. The process is now at exit point 6, as seen in FIG. 8B.

Figures 8C, 8D, 8E:
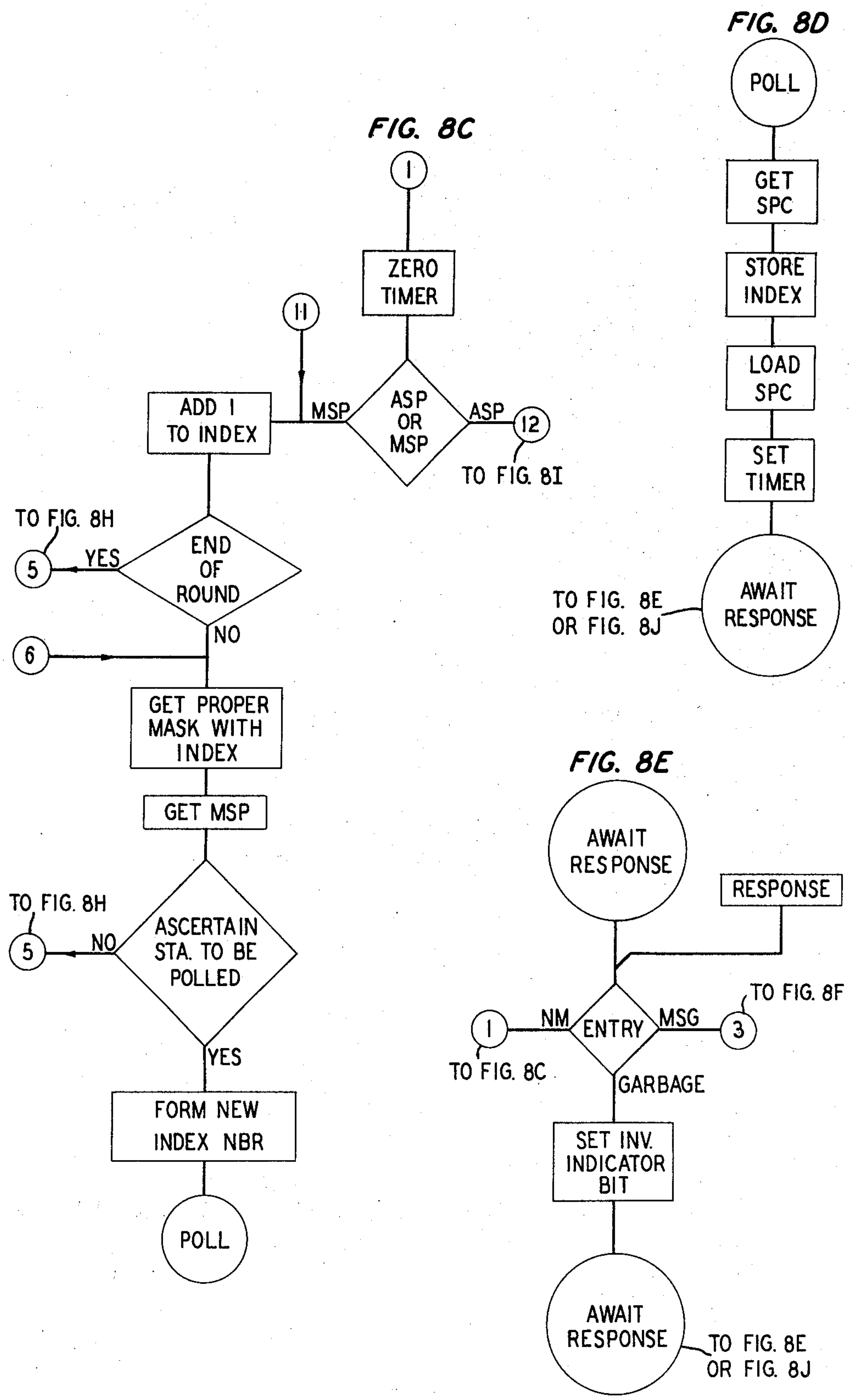

The entry point corresponding to exit point 6 is disclosed in FIG. 8C. This point defines a transient state wherein the data processor obtains the appropriate MASK word from the MASK table in accordance with the INDEX number in the status word. In this case, of course, the INDEX number is "0". The data processor thereupon utilizes the "0" MASK word together with the MSP word of the multistation line (as derived from the ASP/MSP table in FIG. 4) to ascertain the number of the next station to be polled. In a specific program disclosed hereinafter, this function is provided by ANDing the MASK word with the MSP word and determining the rightmost "1" bit position in the resultant word. It is to be noted that the MASK word for the "0" index contains all "1's". Therefore, the resultant word is identical to the MSP word and since the rightmost bit in the MSP word is "1", station "0" would be the next polled. (If we had assumed that the index number "1" MASK word had been obtained, it will be seen that with reference to the MSP word for line A the rightmost bit of the resultant word is "0" (due to the ANDing procedure), as is the next rightmost bit. In this event, then, the third station (station "2") would be the next station to be polled. If no more stations exist or are to be polled, all bits of the resultant word are "0".)

Upon ascertaining the number of the next station to be polled, the process proceeds along decision line YES, the new INDEX number is formed and the process proceeds to exit point POLL. If no more stations exist within the MSP (all bits in the resultant word being "0"), the process would proceed to exit point 5. Under our assumed situation, of course, the station "0" is to be polled, the INDEX number is set to "0", and the process continues to exit point POLL.

The entry point corresponding to the exit point POLL is shown in FIG. 8D. This is a transient state wherein the data processor utilizes the INDEX number to obtain the station poll code word from the POLTAB table (FIG. 3). The INDEX number is also entered in the status word. The station poll code is loaded in the processor output and passed via lead 116 to sender 109 for application to the multistation line, as previously described. A short duration timing period is now initiated and the process advances to the exit point AWAIT RESPONSE. This is a timed duration state or condition of the line which will be terminated by the response by the polled outlying station or by a timeout in the absence of the response. When a response is received, the process proceeds to the corresponding entry point in FIG. 8E whereas, if no response is received and the timer times out, the process proceeds to the corresponding entry point in FIG. 8J.

Assume now that a response is received from an outlying station. The process thereupon flows from entry point AWAIT RESPONSE, in FIG. 8E, and the data processor enters the response and determines whether the response indicates that the outlying station has a message (indicated by decision line MSG); has no message (indicated by decision line NM); or whether the response is garbled and therefore constitutes "garbage". We will assume that the outlying station has a message available and returns a START-OF-MESSAGE code preparatory to sending the message text. The process thereupon advances to exit point 3.

Figure 8F:
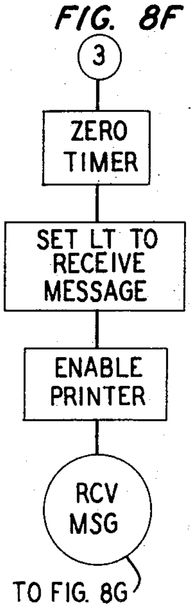

The entry point 3 corresponding to the previously described exit point 3 is shown in FIG. 8F. This is a transient state wherein the data processor resets and turns off the poll response timer and, in addition, modifies the line tag (LT) of the status word to indicate that the line is in the RECEIVE MESSAGE mode. At this time the data processor enables printer 108 (FIG. 1) via lead 115 to record the incoming message from the line station. The flow chart is now at the RECEIVE MESSAGE exit point.

Figure 8G:
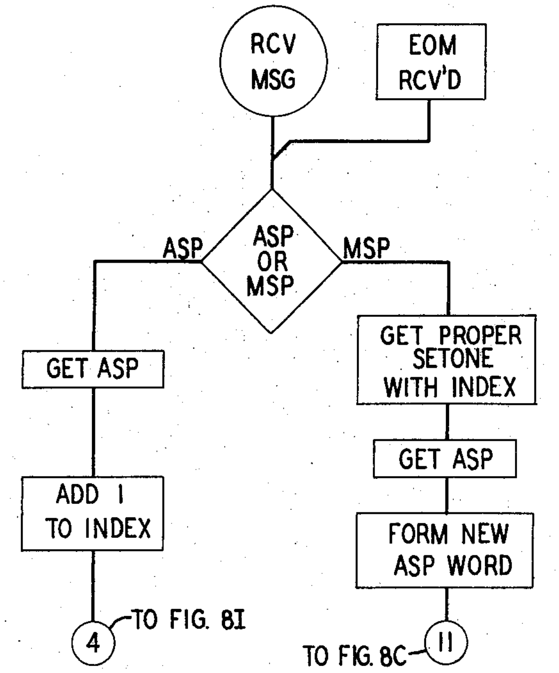

The RECEIVE MESSAGE entry point is shown in FIG. 8G. During the RECEIVE MESSAGE state the message is received from the outlying stations by printer 108 and this state continues until an END-OF-MESSAGE signal is received. Upon receiving the END-OF-MESSAGE signal, the data processor determines from the line tag of the status word whether the process is sending the MSP or ASP pattern. Since we have assumed that the processor is providing the MAIN SKIP POLL, the MSP decision line of the flow chart is selected by the processor. The SETONE word is then selected in accordance with the INDEX number in the status word to insert a "1" in the bit position of the ASP word corresponding to the number of the station which has just sent the message. In the specific process disclosed herein, this is provided by obtaining the ASP word (in the memory shown in FIG. 4), obtaining the INDEX number from the status word, "O Ring" the appropriate SETONE word with the ASP word, and then reinserting the resultant word in the appropriate line of the ASP/MSP table. We have presumed that the station sending the message was the first station polled. It is noted that the index "0" SETONE word (FIG. 7) provides a "1" in the rightmost bit position. Therefore, "O Ring" this SETONE word with the ASP word (FIG. 4) provides a resultant word wherein a "1" is inserted in the rightmost bit position of the ASP word. The "1" in the rightmost bit position of the ASP word indicates that station "0" has responded to the poll by returning a message. This information will be used in the ALTERNATE SKIP POLL. The flow chart at this time is at exit point 11 of FIG. 8G. At this time the outlying station has concluded sending and the data processor will now proceed to poll the next station, if any.

Entry point 11 is shown in FIG. 8C. With the response of the polled station complete, the INDEX number in the status word is increased by "1". This new index word is compared with the STATION COUNT in the status word to determine if the MSP round is over. Since we have assumed that only the first station has been polled, the data processor decides that the round is not over and the process proceeds along decision line NO to the function wherein a new MASK is obtained in accordance with the new INDEX number. The new station number is therefore determined in substantially the same manner as previously described with reference to the first station.

We have assumed that the first outlying station responded to its station poll code by returning a message. It was indicated, with respect to FIG. 8E, that the outlying station might have responded with a code indicating it had no message available. In this case, the data processor decides to proceed along decision line NM. This line extends to exit point 1. The corresponding entry point 1 is seen in FIG. 8C. The data processor, in response to the NO MESSAGE response, resets the polling timer. The status word is then examined so that the data processor can determine if the line is in the MAIN SKIP POLL or ALTERNATE SKIP POLL pattern. Under our assumed condition, the multistation line is in the MAIN SKIP POLL pattern and the data processor thereupon proceeds along the decision line MSP. The INDEX number is thereupon obtained from the status word and is increased by "1". A new station poll code is thereafter obtained in the same manner as previously described.

Recall that, in FIG. 8C after "1" is added to the INDEX, a decision is made whether the round is over. If the decision had been YES, the process would have proceeded to exit point 5. Similarly, after the number of the next station to be polled is ascertained, if there are no further stations to poll, the process would have proceeded to an identical exit point 5. The corresponding entry point 5 is disclosed in FIG. 8H. This is a transient state wherein the data processor has concluded that all of the stations have been polled in the MAIN SKIP POLL pattern and proceeds to initiate the ALTERNATE SKIP POLL.

Figure 8H:
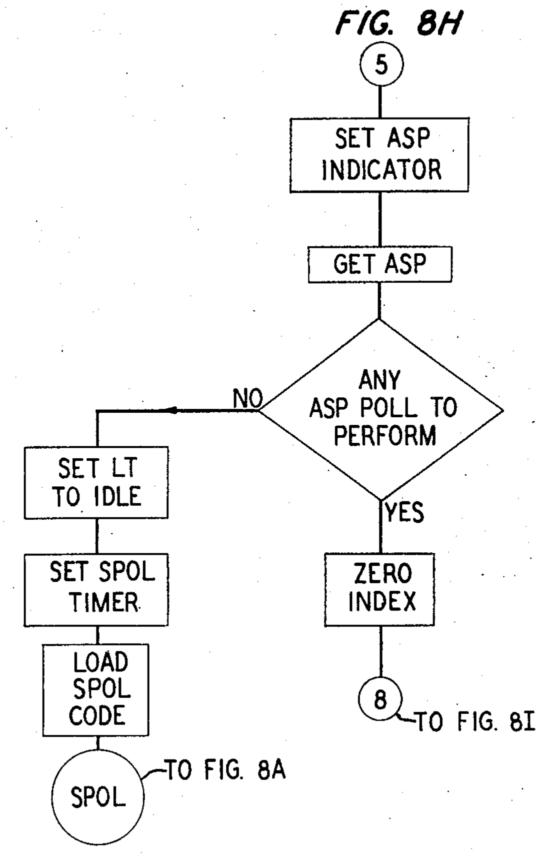

As seen in FIG. 8H, the first function involves setting the ASP/MSP indicator to ASP. The ASP word of the multistation line is obtained and inspected for "1" bits to determine whether any ASP poll is to be performed. In our assumed situation the first station had responded to the MAIN SKIP POLL by sending a message and, therefore, the process would follow decision line YES. Momentarily assume now that the process follows decision line NO, indicating that no station responded to the MAIN SKIP POLL with a message. In this event the line tag in the status word is set to IDLE and the SPOL timer function is initiated. In addition, the SUSPEND POLL code is applied to sender 109 for transmission to the line. The mode or state of the line therefore goes to the SUSPEND POLLING state, which was the initial IDLE condition shown in FIG. 8A, wherein the data processor awaits the timeout of the SPOL timer or another bid from an outlying station.

Under our assumed condition, the first station responded during the MAIN SKIP POLL and the process therefore follows the YES decision line. The INDEX number of the status word is thereupon set to "0" and the process proceeds to exit point 8 in FIG. 8H.

Figure 8I:
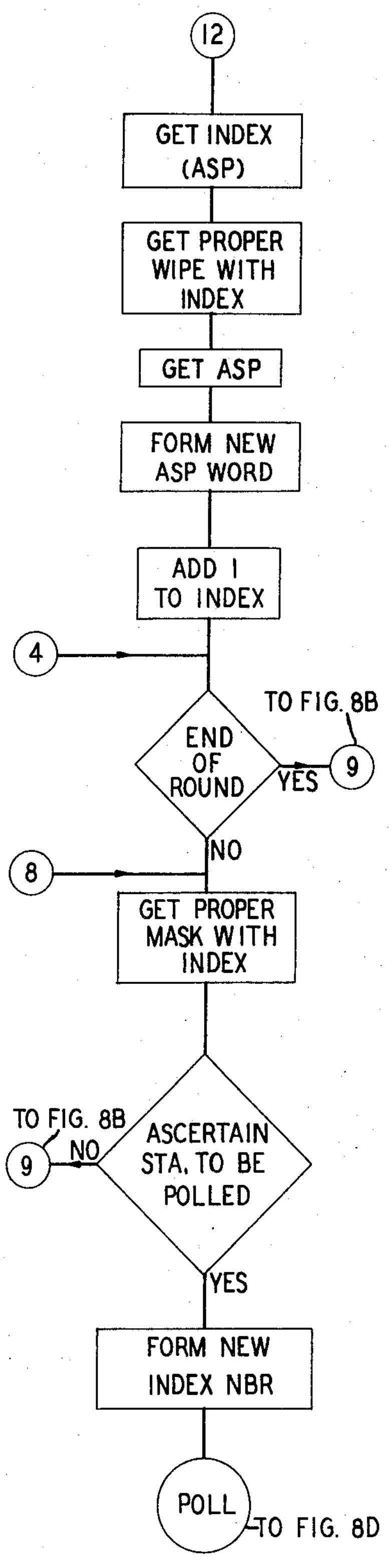

Entry point 8 is shown in FIG. 8I. At this time the processor obtains the proper MASK word and ascertains whether another station is to be polled by ANDing the ASP word with the MASK word and identifying the rightmost "1" bit if one exists. Of course, under our assumed situation, the process continues along the YES line. The processor now forms the new INDEX number and proceeds to exit point POLL in FIG. 8I.

As previously described, entry point POLL is shown in FIG. 8D. The station poll code as defined by the new INDEX number is obtained from the POLTAB table, the INDEX number is stored in the line status word, the station poll code is applied to sender 109, the polling timer is started, and the controller awaits the response from the polled station.

We will assume that the first station polled in the ASP pattern responds to its poll code by returning a message. This process is shown in FIG. 8E, exiting at exit point 3, as previously described. Entry point 3 is disclosed in FIG. 8F, wherein the processor enables printer 108 and the line goes to the RECEIVE MESSAGE mode or condition. When the END-OF-MESSAGE signal is received, as seen in FIG. 8G, an examination of the status word is made to determine whether the process is in the MAIN SKIP POLL or the ALTERNATE SKIP POLL pattern. Since in this situation the line is in the ALTERNATE SKIP POLL mode, the process continues along decision line ASP. As seen in FIG. 8G, the next function is to obtain the ASP word of the multistation line and to add "1" to the INDEX number. The process then continues to exit point 4.

Entry point 4 is disclosed in FIG. 8I. At this point the processor compares the new INDEX number with the STATION COUNT to determine if the process has reached the end of an ASP polling round. Since this is the first station the round, the process proceeds along decision line NO. The appropriate MASK as defined by the new INDEX number is obtained and the number of the next station to be polled is ascertained from the ASP word. The process of polling in the ALTERNATE SKIP POLL pattern is then repeated.

Assume now that in response to the polling, the first station responds that no message is available. As seen in FIG. 8E, this response advances the process to exit point 1 and then to entry point 1 in FIG. 8C. The processor thereupon resets the polling timer and then advances to decision line ASP and to exit point 12.

Entry point 12 is shown in FIG. 8I. At this time the INDEX number is reobtained (which in our assumed situation is the number "0"). The WIPE word corresponding to the "0" index and the ASP word are obtained and the two words are ANDed to obtain a resultant word. Since the rightmost bit in the WIPE word is "0", the "1" bit in the corresponding position in the ASP word is "wiped out". This resultant word therefore forms the new ASP word.

The INDEX number is now increased by "1", the INDEX number is compared with the MAXIMUM STATION COUNT number to determine if this is the end of the ASP round (which, we will presume is NO), the MASK word is obtained, the next station to be polled is ascertained, and the new INDEX number is formed in the same manner as previously described. ALTERNATE SKIP pattern polling is therefore resumed, with the "1" bit in the ASP word corresponding to the station which had no message being wiped out.

As described above, two decisions are made in the flow chart shown in FIG. 8I. The first decision is the determination whether the polling has reached the end of the ALTERNATE SKIP POLL round. The following decision, as seen in FIG. 8I, involves the determination whether another station in the round is to be polled. If the poll is at the end of the round the process advances along decision line YES to exit point 9. Similarly, if no other stations are to be polled, the process advances along decision line NO to exit point 9.

Entry point 9 is shown in FIG. 8B. Since an ALTERNATE SKIP POLL round has been completed, a "1" is added to the ASP COUNT number in the status word. This new ASP COUNT number is compared with the MAXIMUM ROUND COUNT item in the status word to determine whether the process has provided the maximum number of ALTERNATE SKIP POLL rounds. We have assumed here that this is the first round and accordingly the process continues along decision line NO. If it be assumed, however, that the process had proceeded through the maximum number of ASP rounds, the process would advance along decision line YES to a point common with entry point 10. At this time, as previously described, the ASP word, the INDEX number and the ASP COUNT would be "-zeroed" and the ASP/MSP indicator set to MSP, whereupon the process reaches exit point 6. At this point, as previously described, the process would re-initiate a new MAIN SKIP POLL round, starting with entry point 6 in FIG. 8C.

Returning now to the decision by the processor that this ALTERNATE SKIP POLL round count is not the maximum round count, the process seen in FIG. 8B proceeds along decision line NO and at this time obtains the ASP word from the ASP/MSP memory disclosed in FIG. 4. In accordance with the flow chart, the processor now determines from the ASP word whether there are any stations to poll. If, during the previous ALTERNATE SKIP POLL round, none of the stations had messages, the ASP word would have all "0" bits. The process would thereupon proceed along decision line NO to exit point 10. As noted above, entry point 10 is also shown in FIG. 8B and defines the point in the process wherein the ASP word, the INDEX number and the ASP COUNT number are "zeroed" and the ASP/MSP indicator is set to MSP. The processor would in this situation thereupon re-initiate a MAIN SKIP POLL sequence, as previously described.

Return now to the decision of the processor as to whether there are any stations to poll in the ALTERNATE SKIP POLL pattern. It will now be assumed that at least one station responded in the previous ALTERNATE SKIP POLL pattern and the process thereupon proceeds along decision line YES. In this event, the INDEX number in the status word is set to "0" and the process proceeds to exit point 8.

Entry point 8 is shown in FIG. 8I. As previously described, with the process at entry point 8, the proper MASK word is obtained in accordance with the INDEX number and the number of the next station to be polled is ascertained. Another ALTERNATE SKIP POLL round is therefore initiated.

In describing responses to the station polling codes, we have considered the steps wherein the stations respond by sending a message or by sending a code indicating that no message is available thereat. It is noted that a third type of response might occur wherein the code signal received from the outlying station is unrecognizable. As shown in FIG. 8E, when the response is received the processor enters the response and if it is not recognized the process continues along decision line GARBAGE. The processor thereupon sets the INVALID indicator bit in the status word to "1" and remains in the AWAIT RESPONSE mode or state, awaiting a further response from the outlying station to the polling code previously transmitted.

Figure 8J:
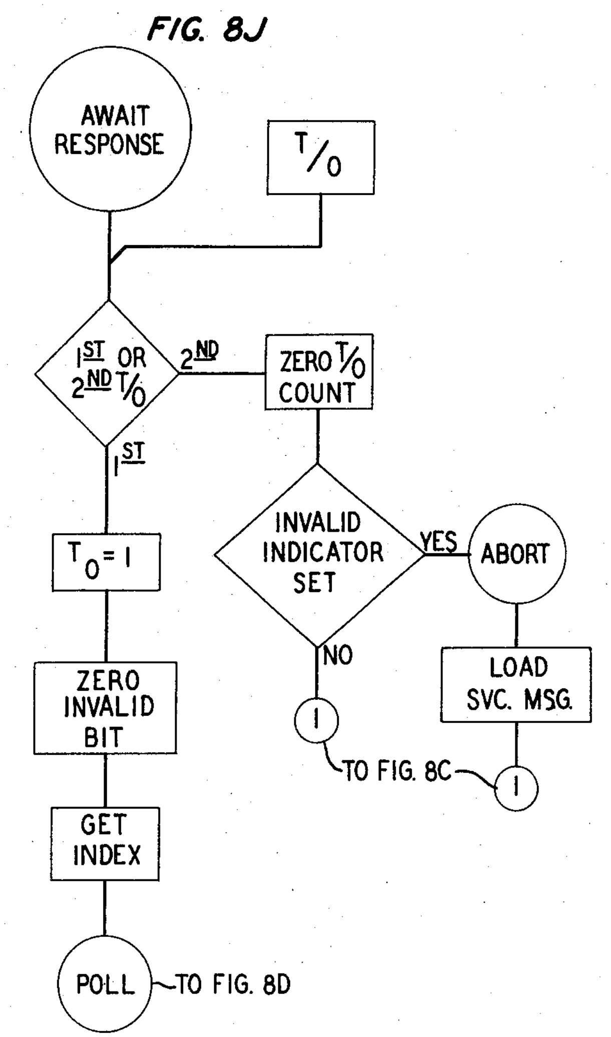

Another situation which may occur after the polling code is transmitted is the failure of the outlying station to provide any response. In this event the polling code timer will time out, a situation which is shown in FIG. 8J. The processor thereupon examines the T/O bit in the status word. Assuming this is the first time out, the process proceeds along decision line "1st". The T/O bit is then set to "1" and the INVALID bit is set to "0". The processor thereupon obtains the INDEX number and proceeds to exit point POLL. The process then proceeds to the corresponding entry point in FIG. 8D. This results in the retransmission of the station polling code since the same INDEX number is used.

In the event that the station again fails to respond or, alternatively, that an unrecognizable signal is received, the timer again times out. In this event, as seen in FIG. 8J, the processor determines that a second timeout occurs and the process proceeds along decision line "2nd"a. The timeout count in the status word is set to "0" and the INVALID indicator is examined. If an invalid response had not been received in this interim, the process continues along decision line NO to exit point 1. Entry point 1 is disclosed in FIG. 8C, at which point in the process the timer is reset and the process proceeds to poll the next station in the MAIN SKIP POLL or ALTERNATE SKIP POLL pattern, whichever is presently being transmitted. The result of this procedure, wherein no response of any sort is received, is to skip the polled station and proceed to the next one.

In the event that during the timing interval a non-valid response (garbage) is received prior to the second timeout, the processor proceeds along decision line YES in FIG. 8J. This results in the ABORT condition or mode. In this mode the processor applies a code character or characters to sender 109 to form a service message and then proceeds to exit point 1, whereupon the next station is polled. Accordingly, when invalid responses are received from the polled station, indicating that the polled station is receiving the polling code but is improperly responding, a service message is sent thereto to advise the outlying station of the problem condition.

A listing of a program for providing the previously described machine process is disclosed in FIGS. 9A through 9E. The program language is the Lockheed Electronics Assembly Program (LEAP) for the MAC 16 Multi-Application Computer of the Lockheed Electronics Company, Los Angeles, California. A description of the program language is disclosed in the *Lockheed Electronics LEAP Assembler Manual*, January 1970, Third Edition - Copyright 1969 by Lockheed Electronics Company.

FIG. 10 discloses the program listing defining the data information initially stored in the memories shown in FIGS. 2 through 7. The previously described machine process is therefore provided on the MAC 16 Lockheed computer initially supplied with the data information in the program listing disclosed in FIG. 10 and operated in accordance with the program shown in the listing disclosed in FIGS. 9A through 9E.

It is to be noted that the program listing does not include programming for the various timing intervals. As seen in FIGS. 9A through 9E, timing intervals are provided by ancillary "dummy" timers. Programs for providing timing intervals, however, are well known in the art and may be provided in any conventional manner.

Although a specific machine process has been shown and described it will be understood that various modifications may be made without departing from the spirit of this invention. For example, "1" bits may be inserted in the ASP word when it is newly formed instead of all "0" bits, whereby predetermined stations will invariably be polled during the first ASP round. Another variation may include polling certain stations a plurality of times during the MSP polling round by allocating a plurality of INDEX numbers to the station. The ASP round could, in this latter case, be arranged to similarly poll these stations a plurality of times when messages are available thereat. A further variation may include polling certain stations at least twice before being "-wiped" from the ASP word.

I claim:

1. A method of processing a pattern defining a sequence of polling codes which are transmitted in the sequence by a controller to a multistation line to obtain responses from the several line stations indicating whether messages are available thereat, comprising the step of:

modifying the sequence by directly varying the number of times the polling codes appear in the pattern with the quantity of message traffic available at the corresponding several stations as determined from the responses.

2. A method of processing a pattern of polling codes in accordance with claim 1 wherein the step of modifying the sequence includes adding a polling code to the pattern when a response indicates that the corresponding station has a message thereat.

3. A method of processing a pattern of polling codes in accordance with claim 1 wherein the step of modifying the sequence includes removing a polling code from the pattern when a response indicates that messages are unavailable at the corresponding station.

4. A method of forming a sequence of polling codes which are initially all transmitted in a main sequence to stations on a multistation line to obtain responses from the several stations indicating whether messages are available thereat comprising the steps of:

storing a data pattern in a memory defining an alternate sequence of polling codes, and modifying the alternate sequence by varying the number of times the several polling codes appear in the pattern in accordance with the responses from the several stations.

5. A method of forming a sequence of polling codes in accordance with claim 4 wherein the step of modifying the alternate sequence includes inserting data defining the polling code of each station whose response indicates that a message is available thereat.

6. A method of forming a sequence of polling codes in accordance with claim 4 wherein the step of modifying the alternate sequence includes wiping out data defining the polling code of each station whose response indicates that messages are unavailable thereat.

7. A method of polling stations, on a multistation line, utilizing a plurality of stored polling codes to obtain responses from the several stations indicating whether messages are available thereat comprising the steps of:

transmitting to the line a main sequence of the stored polling codes, forming a data pattern in the memory to define an alternate sequence of polling codes by varying the number of times the several polling codes appear in the pattern in accordance with the responses by the several stations to the main sequence, and transmitting to the line the stored polling codes in the alternate sequence as defined in the data pattern.

8. A method of polling stations, in accordance with claim 7, wherein the step of forming the data pattern includes inserting data defining the polling code of each station whose response indicates that a message is available thereat.

9. A method of polling stations, in accordance with claim 7, including the additional steps of:

modifying the data pattern to change the defined alternate sequence of polling codes in accordance with the responses by the several stations to the alternate sequence, and transmitting to the line the stored polling codes in the alternate sequence as defined in the modified data pattern.

10. A method of polling stations, in accordance with claim 9, wherein the step of modifying the data pattern includes wiping out data defining the polling code of each station whose response indicates that messages are unavailable thereat.

11. A method of polling stations, in accordance with claim 10, wherein the step of modifying the data pattern is repeated each time the alternate sequence defined by the modified data pattern is transmitted to the line.

12. A method of polling stations, in accordance with claim 11, wherein the step of transmitting the main sequence is initiated after a predetermined plurality of alternate sequences are transmitted to the line.

13. A method of polling stations, in accordance with claim 11, wherein the step of transmitting the main sequence is initiated when all data defining polling codes is wiped out of the modified data pattern.

* * * * *